(12) United States Patent
Gross et al.

(10) Patent No.: US 10,031,312 B2
(45) Date of Patent: Jul. 24, 2018

(54) ADAPTING CAMERA SYSTEMS TO ACCESSORY LENSES

(71) Applicant: Apple Inc., Cupertino, CA (US)

(72) Inventors: Kevin A. Gross, San Francisco, CA (US); Richard L. Baer, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 15/233,669

(22) Filed: Aug. 10, 2016

(65) Prior Publication Data

US 2018/0048793 A1 Feb. 15, 2018

(51) Int. Cl.
| | | |
|---|---|---|
| G02B 7/00 | (2006.01) | |
| H04N 5/225 | (2006.01) | |
| G03B 17/14 | (2006.01) | |
| H04N 5/232 | (2006.01) | |
| G03B 17/56 | (2006.01) | |
| G03B 5/02 | (2006.01) | |
| G03B 17/12 | (2006.01) | |

(52) U.S. Cl.
CPC .............. G02B 7/005 (2013.01); G03B 5/02 (2013.01); G03B 17/12 (2013.01); G03B 17/14 (2013.01); G03B 17/565 (2013.01); H04N 5/2254 (2013.01); H04N 5/23229 (2013.01); G03B 2205/0092 (2013.01)

(58) Field of Classification Search
CPC .. H04N 5/2254; H04N 5/23229; G02B 7/005; G03B 5/02; G03B 17/12; G03B 17/14; G03B 14/565; G03B 2205/0092
See application file for complete search history.

(56) References Cited

U.S. PATENT DOCUMENTS

| | | | |
|---|---|---|---|
| 8,073,324 B2 | 12/2011 | Tsai | |
| 8,368,773 B1 | 2/2013 | Jin | |
| 8,520,122 B2 * | 8/2013 | Shiraki | G02B 27/0068 348/208.11 |
| 8,842,981 B2 | 9/2014 | Fujikake et al. | |
| 9,188,764 B2 | 11/2015 | O'Neill | |

(Continued)

OTHER PUBLICATIONS

International Search Report from PCT/US2017/045715, dated Oct. 26, 2017, Apple Inc., pp. 1-11.

Primary Examiner — Lin Ye
Assistant Examiner — Chriss Yoder, III
(74) Attorney, Agent, or Firm — Robert C. Kowert; Meyertons, Hood, Kivlin, Kowert & Goetzel, P.C.

(57) ABSTRACT

A small format factor camera system for mobile devices that provides improved image quality when using accessory lenses. The system may detect an accessory lens attached to the camera, either via sensing technology or by analyzing captured images. The system may analyze image data to determine current alignment (e.g., optical axis alignment, spacing, and/or tilt) of the accessory lens relative to the camera lens, and may shift the camera lens on one or more axes using a mechanical or optical actuator, for example to align the camera lens optical axis with the accessory lens optical axis. The system may also determine optical characteristics of the accessory lens, either via sensing technology or by analyzing captured images, and may apply one or more image processing functions to images captured using the accessory lens according to the determined optical characteristics of the accessory lens.

20 Claims, 16 Drawing Sheets

(56) References Cited

U.S. PATENT DOCUMENTS

| | | |
|---|---|---|
| 9,191,562 B1 | 11/2015 | Schorr, II |
| 2007/0211154 A1* | 9/2007 | Mahmoud ............ H04N 5/3572 348/251 |
| 2009/0143099 A1* | 6/2009 | Kang ..................... G03B 17/14 455/556.1 |
| 2010/0080545 A1* | 4/2010 | Fan ......................... G03B 5/02 396/55 |
| 2012/0114319 A1* | 5/2012 | Kishida .................. G02B 7/102 396/71 |
| 2013/0177304 A1 | 7/2013 | Chapman et al. |
| 2015/0062422 A1 | 3/2015 | Stern |
| 2016/0006934 A1 | 1/2016 | Eromaki et al. |
| 2016/0085086 A1 | 3/2016 | Rho et al. |
| 2016/0134793 A1 | 5/2016 | Samanta et al. |

\* cited by examiner

ADAPTING CAMERA SYSTEMS TO ACCESSORY LENSES

BACKGROUND

Technical Field

This disclosure relates generally to camera systems, and more specifically to adapting camera systems to accessory lenses.

Description of the Related Art

Many small, mobile devices such as smartphones and tablet or pad devices include small form factor cameras integrated within the devices. Accessory lenses are available that attach or mount in front of the camera lens on these devices and that can be used, for example, to either reduce or increase the focal length of the camera, or to enable closer-focusing macro capabilities. However, to achieve optimal image quality, the optical axis of the accessory lens should be coaxial with the optical axis of the camera lens. In addition, spacing between the accessory lens and the camera lens should be correct. Due to manufacturing and other constraints, these goals are difficult to achieve "out of the box."

SUMMARY OF EMBODIMENTS

Embodiments of the present disclosure may provide improved image quality for small format factor (SFF) cameras when using accessory lenses. SFF cameras may, for example, be used in mobile devices such as smartphones, cell phones, pad or tablet devices, and may also be used in other devices such as laptop or notebook computers. Accessory lenses may be provided that attach to or mount in front of the SFF camera's lens. These accessory lenses can be used to shrink or expand the focal length of the camera lens, or to enable closer-focusing macro capabilities, for example. To achieve optimal image quality, the optical axis of the accessory lens should be coaxial with the optical axis of the camera lens in the device to which it is attached. In addition, spacing between the accessory lens and the camera lens should be correct.

Embodiments of an SFF camera system are described that include a lens system, a photosensor, camera control, image analysis, and image processing software (collectively referred to as a camera application) implemented by one or more processors, and technology, referred to as an actuator component or actuator, that is configured to mechanically or optically adjust the camera lens on one or more axes in response to direction of the camera application.

An accessory lens may be attached, mounted or held relative to the camera lens of a device such that the accessory lens directs light passing through the accessory lens to the camera lens. In some embodiments, the camera application may determine that an accessory lens is mounted on or attached to the device. In some embodiments, presence of an accessory lens may be detected using a sensing technology interface, for example an electrical, magnetic, optical, or radio frequency (RF) sensing technology interface. In some embodiments, presence of an accessory lens may be detected by analyzing captured image data to detect that one or more image metrics (e.g., focus, sharpness, relative illumination, optical distortion, chromatic aberration, magnification, vignetting, a Fourier spectrum of the image, and/or field of curvature) have changed from known (e.g., calibrated) image metrics for the camera lens.

In some embodiments, the actuator, under control of the camera application, may be used to improve alignment of the optical axis of the camera lens with the optical axis of the accessory lens. In some embodiments, the actuator, under control of the camera application, may be used to adjust spacing between the camera lens and the accessory lens. In some embodiments, the actuator, under control of the camera application, may be used to tilt the optical axis of the camera lens to compensate for tilt of the optical axis of the accessory lens. In some embodiments, the camera application measures one or more image metrics (e.g., sharpness, illumination, vignetting, Fourier spectrum, etc.) from one or more images captured by the SFF camera using the accessory lens, and applies a feedback/optimization algorithm that adjusts the position (axis alignment, spacing, and/or optical axis tilt) of the camera lens with respect to the accessory lens using the functionalities provided by the actuator such that a measured image metric is maximized.

In some embodiments, the camera application may obtain or estimate one or more optical characteristics of an accessory lens such as focal length, focal range, image circle diameter, or aberration parameters. In some embodiments, the obtained or estimated optical characteristics of the accessory lens may, for example, be used to enable special user interface (UI) elements, as input to image processing algorithms, and/or to instantiate special image processing algorithms that take advantage of or compensate for the specifics of the accessory lens. In some embodiments, one or more optical characteristics of the accessory lens may be obtained via a sensing technology interface, or may be obtained (e.g., as a lens profile) from an external source such as the accessory lens manufacturer. In some embodiments, one or more optical characteristics of the accessory lens may be estimated by analyzing captured image data to detect change in one or more optical characteristics (e.g., focal length or focal distance/range) from known (e.g., calibrated) optical characteristics for the camera lens.

Figure 1A:
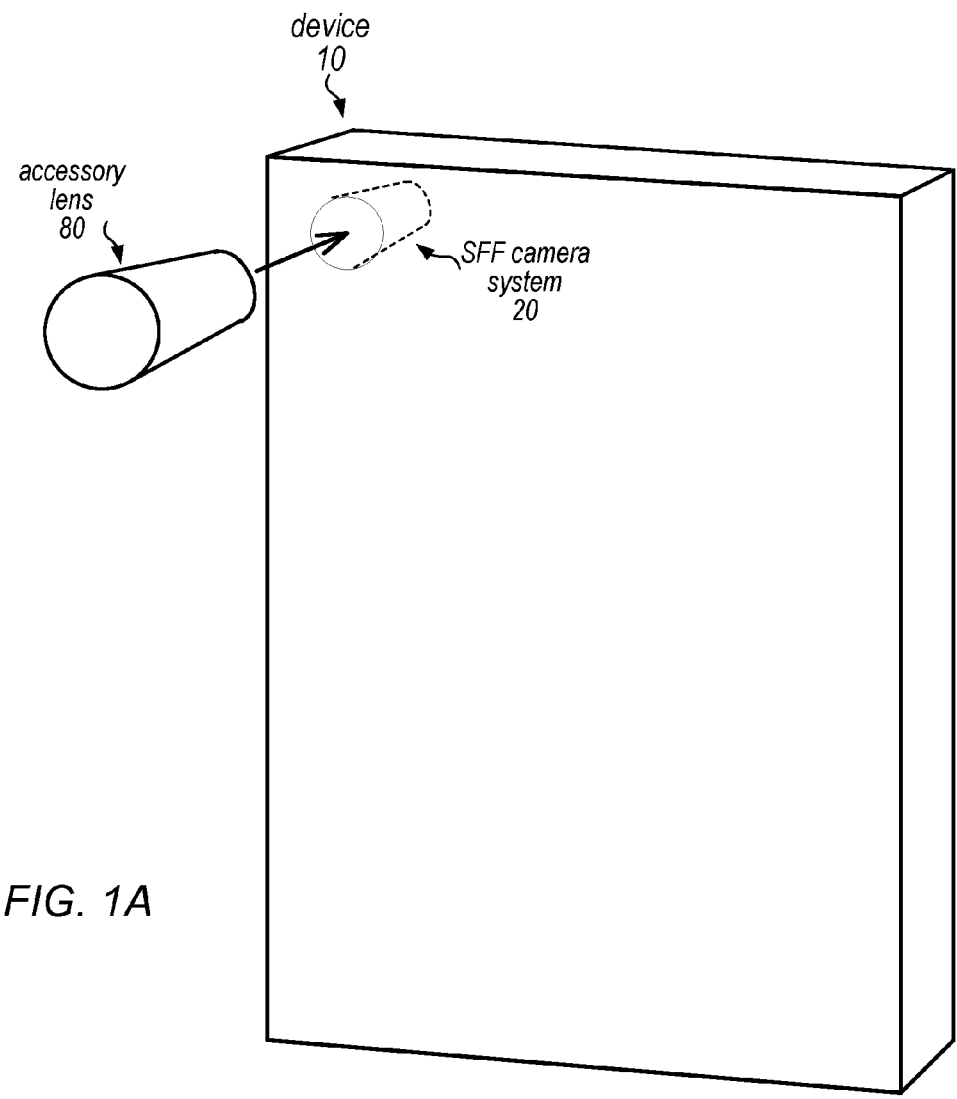
FIG. 1A illustrates an example device that includes an embodiment of a small format factor (SFF) camera system to which an accessory lens may be attached, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a small format factor (SFF) camera system for mobile devices are described that provide improved image quality when using accessory lenses. Embodiments of the SFF camera system may include a lens system, a photosensor, camera control, image analysis, and image processing software (collectively referred to as a camera application) implemented by one or more processors, and technology, referred to as an actuator component or actuator, that is configured to mechanically or optically adjust the camera lens on one or more axes in response to direction of the camera application. For example, the actuator may provide optical image stabilization (OIS) functionality for the camera by shifting the camera lens on one or more axes (referred to as the X and Y axes) orthogonal to the optical (Z) axis of the camera in response to direction of the camera application. The actuator of the SFF camera system may also provide focusing functionality for the camera, for example by shifting the camera lens up or down on the optical (Z) axis in response to direction of the camera application. In some embodiments, the actuator of the SFF camera system may also be configured to tilt the camera lens to adjust the angle of the optical axis with respect to the plane of the photosensor. An SFF camera system may be configured to capture still images, video streams, or both.

The size of an SFF camera is constrained by the dimensions (e.g., the thickness) of a device into which the camera is to be integrated. For example, some mobile devices such as smartphones, ultralight notebook computers, and pad devices may be just a few millimeters (e.g., 6-8 mm) thick, and an SFF camera for such a device is correspondingly sized, with total track length (TTL) of the camera lens (as defined form the object side surface of the camera lens to an image plane formed by the camera lens at the camera photosensor) being about or less than the thickness of the device. Note that TTL of a SFF camera may be increased by camera lens technologies such as "folding" the lens system using a reflective element within the lens stack such as a prism or mirror on the optical path, in which case the camera (Z) thickness may be defined by distance from the object side surface of the camera lens to the rear edge of the reflective element. However, SFF cameras may be correspondingly larger for mobile devices that are thicker, e.g. 8-20 mm. Thus, SFF cameras may in some instances include cameras of a size suitable for use in devices or applications that provide at most 20 mm of thickness for the camera. However, note that the camera technologies and methods as described herein may be used for larger cameras and for different applications. Also note that, while embodiments of an SFF camera system are primarily described for use in mobile multipurpose devices such as smartphones and pad devices, embodiments may be used in any of a variety of devices, or even as standalone cameras.

Figure 13:
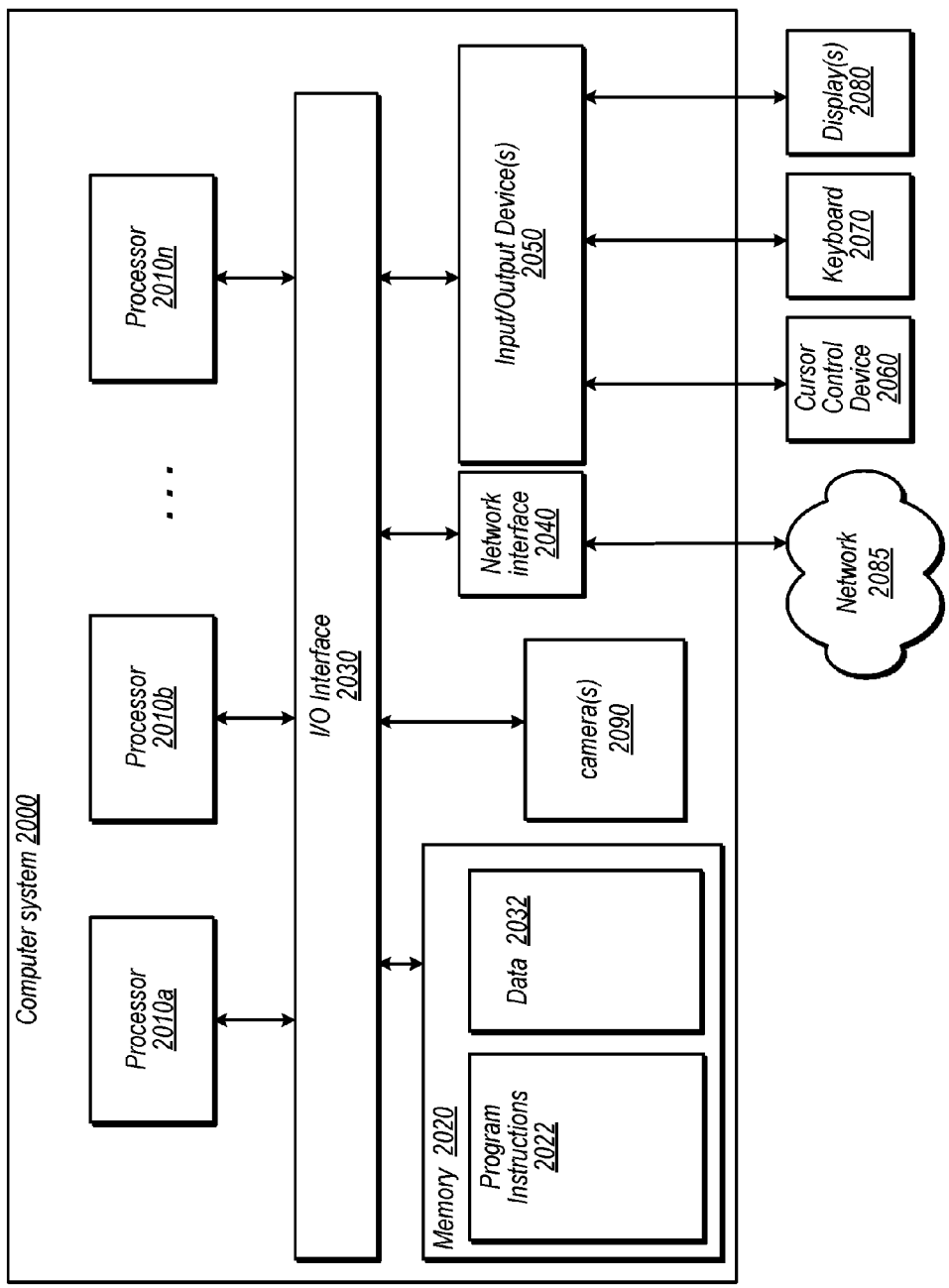
FIG. 13 illustrates an example computer system that may be used in embodiments.

FIG. 1A illustrates an example device 10 that includes an embodiment of a small format factor (SFF) camera system 20 to which an accessory lens 80 may be attached, according to some embodiments. An SFF camera system 20 may, for example, be integrated in mobile devices such as smartphones, cell phones, and pad or tablet devices. FIG. 13 illustrates an example computing system architecture that may be used in a device 10, in some embodiments.

An accessory lens 80 may be attached, mounted or held relative to the lens of the SFF camera system 20 of the device 10 such that the accessory lens 80 directs light passing through the accessory lens 80 to the camera 20 lens. An accessory lens 80 may be attached to the SFF camera system 20 of the device 10 in any of a variety of ways, for example using a threaded collar, snap or twist on collar, clamp, or magnetic coupling. Note that an accessory lens 80 may not require direct attachment to or contact with the camera 20. For example, an accessory lens 80 may not physically contact or be physically connected to the camera 20 portion of a device 10, but instead may physically contact or be physically attached or mounted to another portion of the device 10 housing and held relative to the lens of the camera 20.

An accessory lens 80 may affect the focal length of the camera 20, for example increasing or decreasing the effective focal length of the camera 20, and may also affect the focal distance or range of the camera 20. As an example, an accessory lens 80 may provide or extend zoom and/or telephoto capabilities for the camera 20. As another example, an accessory lens 80 may provide closer focusing (macro) capabilities for the camera 20. As another example, an accessory lens 80 may provide wide-angle or "fish eye" capabilities for the camera 20.

Figure 1B:
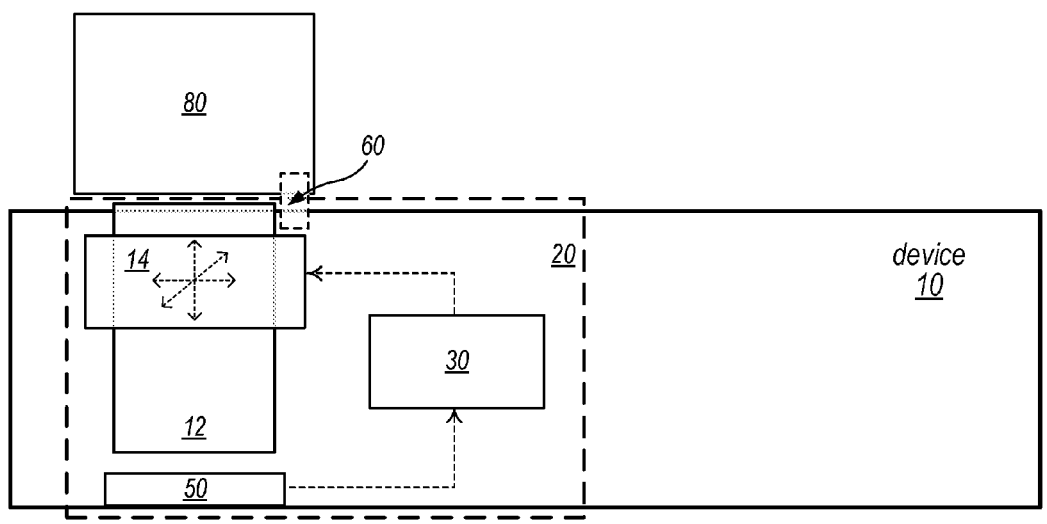
FIG. 1B is a cross-sectional diagram of an example small format factor (SFF) camera system in a device to which an accessory lens may be attached, according to some embodiments.

FIG. 1B is a cross-sectional diagram of an example small format factor (SFF) camera system 20 in a device 10 to which an accessory lens 80 may be attached, according to some embodiments. An SSF camera system 20 may include, but is not limited to, a photosensor 50, a camera lens 12, a camera application 30 implemented by one or more processors, and an actuator 14. The camera lens 12 may include one or more refractive lens elements, which collectively may be referred to as a lens stack, lens barrel, or master lens, and may also include other elements such as an infrared (IR) filter and aperture stop.

Figure 2:
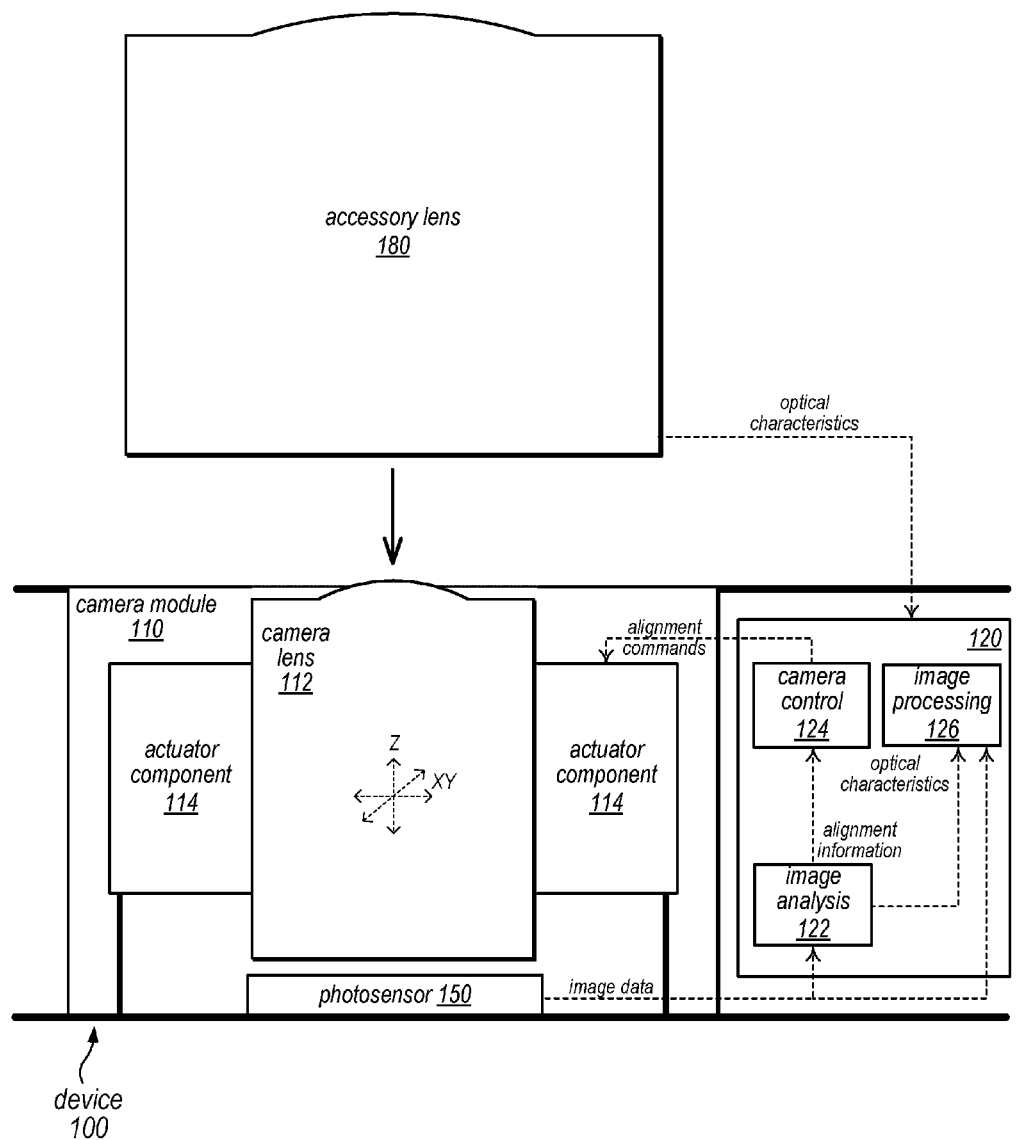
FIG. 2 illustrates an example mechanical actuator in a camera module that mechanically adjusts the camera lens of a small form factor camera to adapt the camera to an accessory lens, according to some embodiments.
Figure 3:
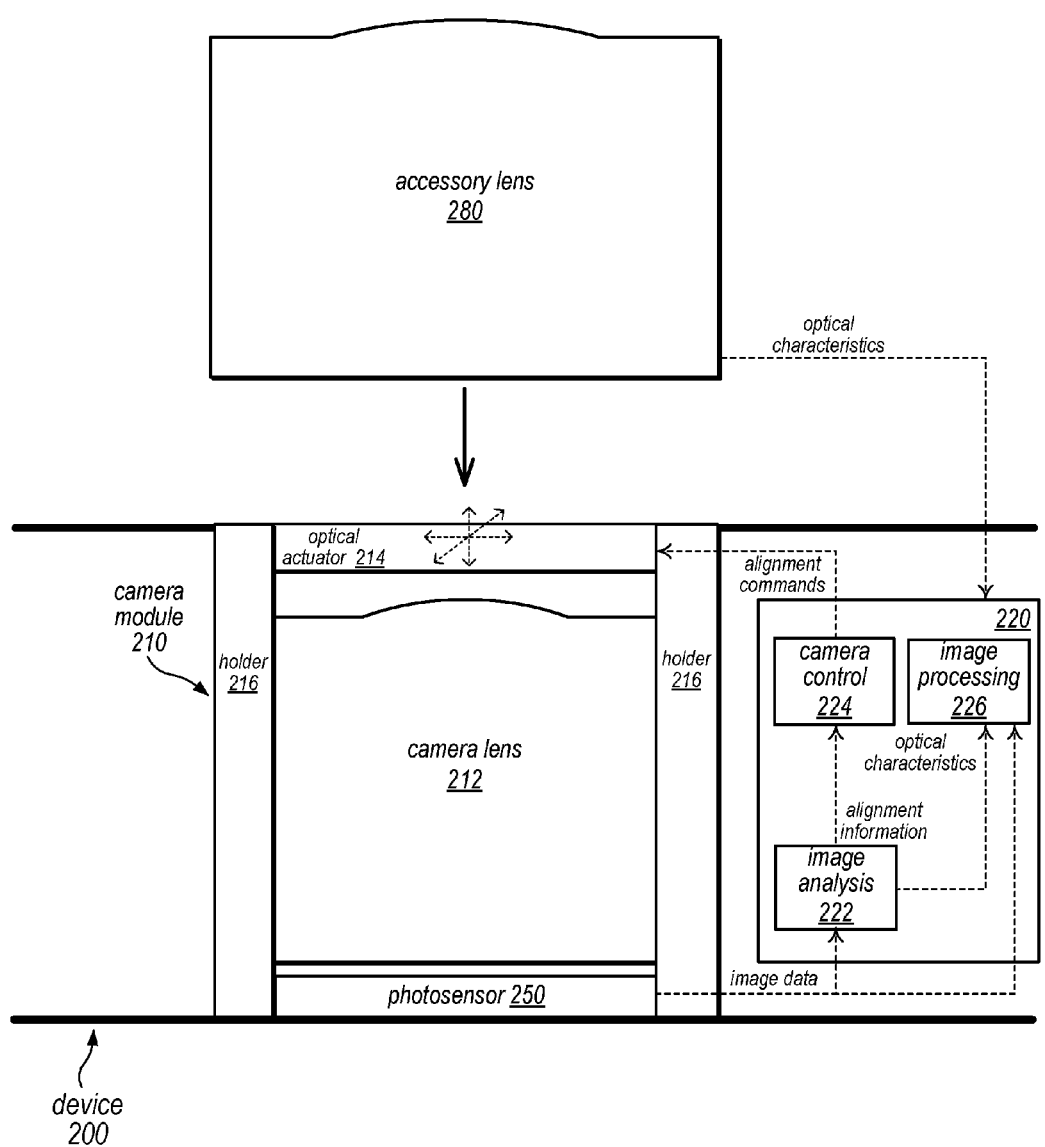
FIG. 3 illustrates a camera module with a fixed camera lens and an optical actuator that may be used to adjust the camera lens for presence of an accessory lens, according to some embodiments.
Figure 4A:
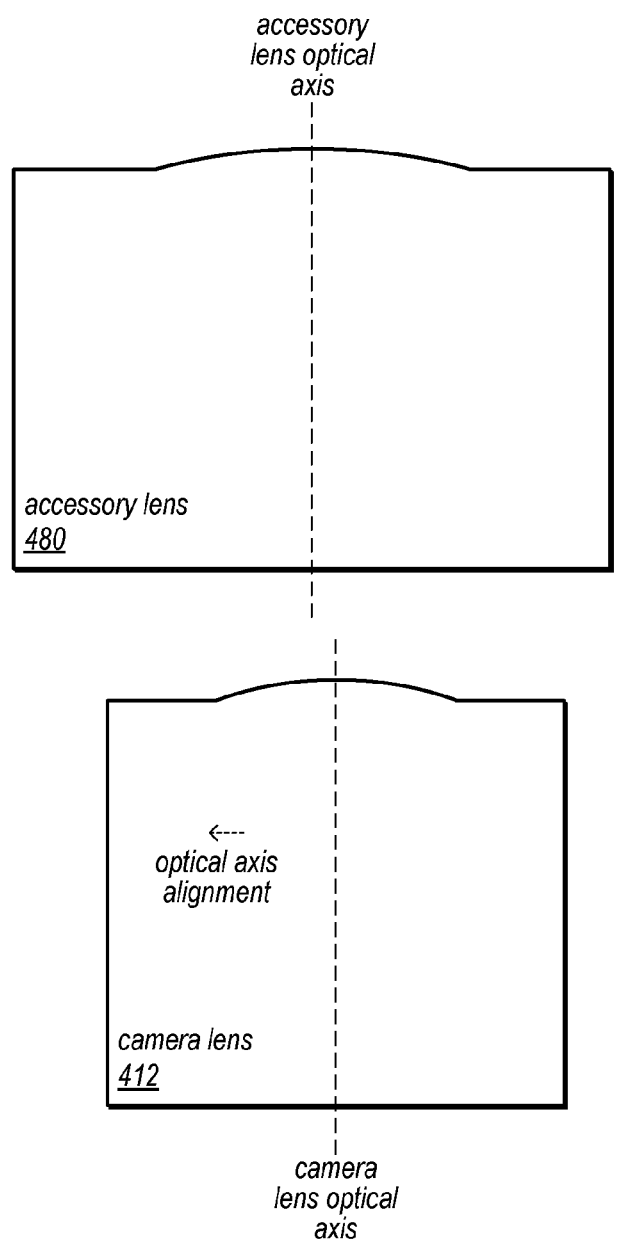
FIG. 4A graphically illustrates optical axis alignment in an SFF camera system with an accessory lens attached, according to some embodiments.
Figure 4B:
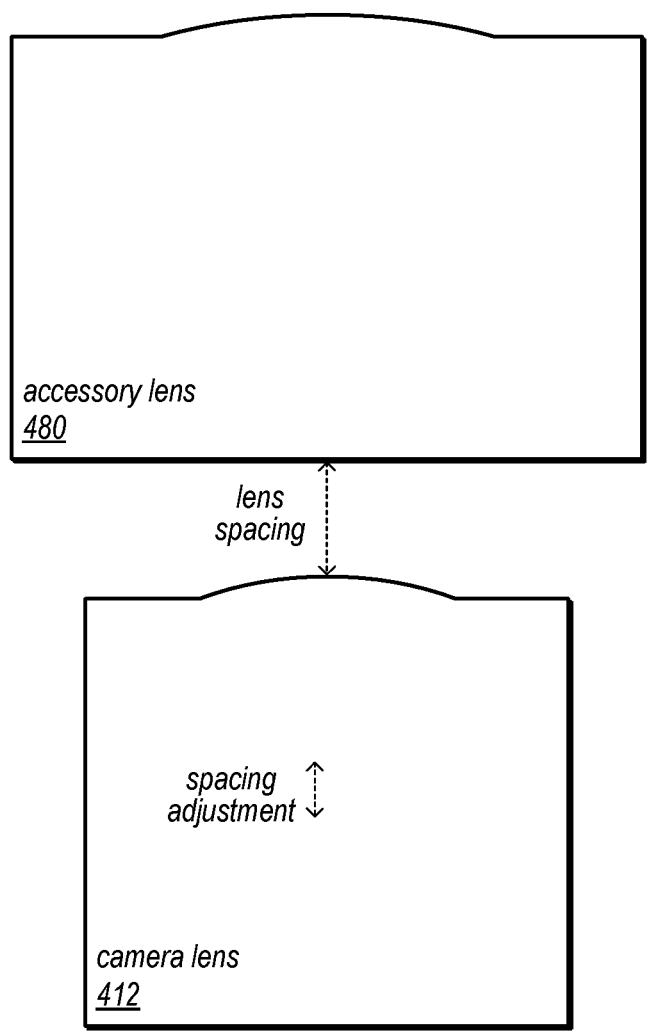
FIG. 4B graphically illustrates lens spacing adjustment in an SFF camera system with an accessory lens attached, according to some embodiments.
Figure 4C:
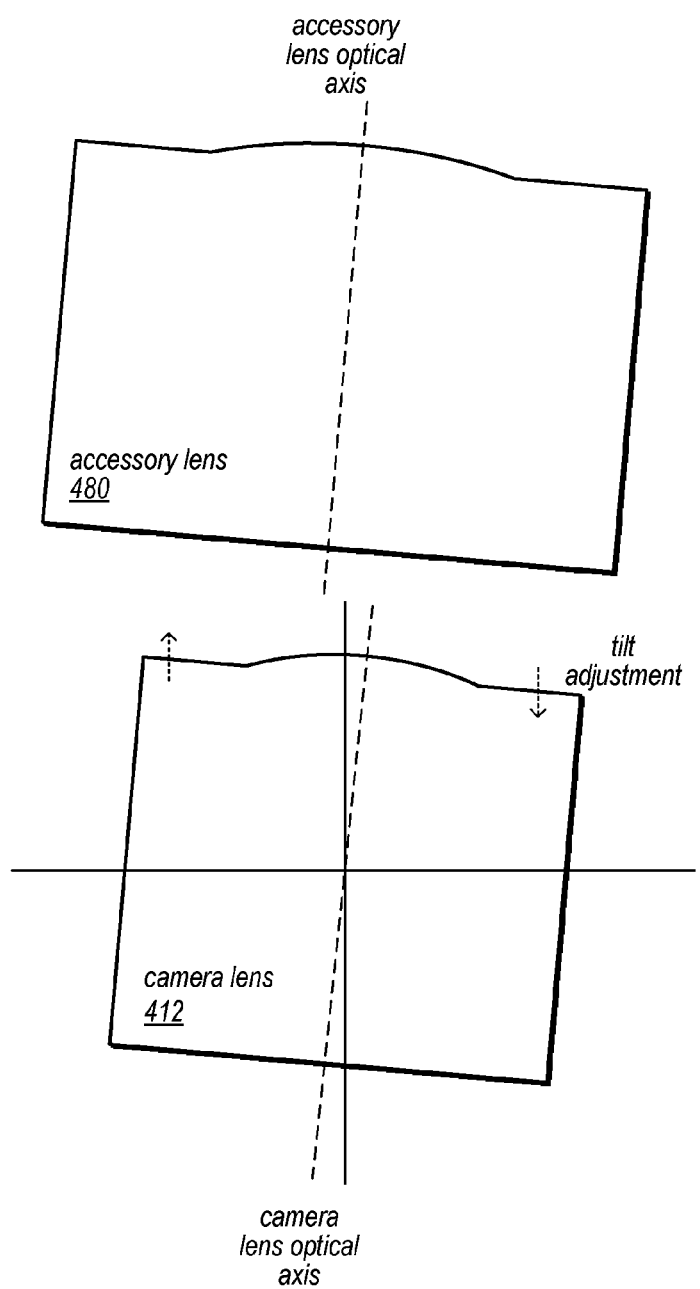
FIG. 4C graphically illustrates tilt adjustment in an SFF camera system with an accessory lens attached, according to some embodiments.

The actuator 14 may be configured to mechanically or optically adjust the camera lens 12 on one or more axes in response to direction of the camera application 30. For example, in some embodiments, the actuator 14 may provide optical image stabilization (OIS) functionality that, under control of the camera application 30, may be used to shift the optical axis on one or more axes (referred to as X and Y axes) orthogonal to the optical (Z) axis of the camera lens 12 to align the optical axis of the camera lens 12 with the optical axis of an accessory lens 80. FIG. 4A graphically illustrates optical axis alignment. As another example, in some embodiments, the actuator 14 may provide autofocus (AF) functionality that, under control of the camera application 30, may be used to shift the camera lens 12 up or down on the optical (Z) axis to adjust spacing between the camera lens 12 and an accessory lens 80. FIG. 4B graphically illustrates lens spacing adjustment. As another example, in some embodiments, the actuator 14, under control of the camera application 30, may be used to tilt the camera lens 12 to compensate for tilt of the accessory lens 80. FIG. 4C graphically illustrates tilt adjustment. FIGS. 2 and 3 illustrate example camera modules that include examples of different types of actuators 80 that may be used in a camera system 20 to adjust the camera lens 12 according to alignment, spacing, and tilt relative to the accessory lens 80, with FIG. 2 showing an example mechanical actuator that mechanically adjusts the camera lens 12 and FIG. 3 showing an example optical actuator that optically adjusts the camera lens 12.

In some embodiments, the camera application 30 may determine that an accessory lens 80 is attached to the camera lens 12 of the device 10. In some embodiments, sensing technology, for example electrical, magnetic, optical, or radio frequency (RF) sensing technology, may be built into an accessory lens 80 and device 10, and presence of the accessory lens 80 may be detected using a sensing technology interface 60, for example an electrical, magnetic, optical, or radio frequency (RF) sensing technology interface. In some embodiments, an accessory lens 80 may not include sensing technology, and presence of the accessory lens 80 may instead be detected by the camera application 30 by analyzing image data captured by the photosensor 50 using the accessory lens 80 to detect that one or more image metrics (e.g., sharpness, relative illumination, optical distortion, chromatic aberration, magnification, vignetting, Fourier spectrum, and/or field of curvature) have changed from known (e.g., calibrated) image metrics for image data captured using the camera lens 12 without an accessory lens 80.

In some embodiments, the actuator 14, under control of the camera application 30, may be used to align the optical axis of the camera lens 12 with the optical axis of the accessory lens 80. In some embodiments, the actuator 14, under control of the camera application 30, may be used to adjust spacing between the camera lens 12 and the accessory lens 80. In some embodiments, the actuator 14, under control of the camera application 30, may be used to tilt the camera lens 12 to compensate for tilt of the accessory lens 80. In some embodiments, the camera application 30 measures one or more image metrics (e.g., sharpness, illumination, vignetting, Fourier spectrum, etc.) from one or more images captured by the photosensor 50 of the SFF camera system 20 using the accessory lens 80, and applies a feedback/optimization algorithm that adjusts the position (axis alignment, spacing, and/or tilt) of the camera lens 12 with respect to the accessory lens 80 using the functionalities provided by the actuator 14 such that quality of the measured image metric(s) are maximized.

In some embodiments, the camera application 30 may obtain or estimate one or more optical characteristics of an accessory lens 80 such as focal length or focal range. In some embodiments, the obtained or estimated optical characteristics of the accessory lens 80 may, for example, be used to enable special user interface (UI) elements, as input to image processing algorithms, and/or to instantiate special image processing algorithms that take advantage of or compensate for the optical characteristics of the accessory lens 80. In some embodiments, one or more optical characteristics (e.g., focal length, focus distance/range, image circle diameter, aberration parameters etc.) of the accessory lens 80 may be obtained by the camera application 30 via a sensing technology interface 60 to the accessory lens 80, or may be obtained (e.g., as a lens profile) from an external source such as the accessory lens manufacturer. In some embodiments, one or more optical characteristics (e.g., focal length, focus distance/range, image circle diameter, aberration parameters, etc.) of the accessory lens 80 may be estimated by the camera application 30 by analyzing captured image data to detect change in one or more optical characteristics (e.g., focal length and/or focal distance/range) from known (e.g., calibrated) optical characteristics for the camera lens 12. For example, in cases where the accessory lens 80 changes the focal length of the camera system 20, the camera system focal length may be estimated by analyzing how features in two or more captured images (e.g., frames in a video stream) move as the device 10 is rotated and correlating the speed of the image motion to motion data determined by motion sensing technology of the device 10. As another example, in the case of a macro accessory lens 80 (where both the system focal length and focus distance are changed), the focus distance/range may be estimated by applying known amounts of defocus of the camera lens 12 and by calculating the rate at which the image magnification changes to infer the focus distance.

As noted above, the obtained or estimated optical characteristics of the accessory lens 80 may be used as input to image processing algorithms and/or to instantiate special image processing algorithms that take advantage of or compensate for the specifics of the accessory lens 80. As an example, if the obtained or estimated optical characteristics of the accessory lens 80 indicate that the accessory lens 80 is a wide-angle or fish-eye adapter lens that introduces significant vignetting in the corners of the image, the camera application 30 may use this information to automatically crop images captured by the photosensor 50 to prevent vignetting. As another example, if the obtained or estimated optical characteristics of the accessory lens 80 indicate that the accessory lens 80 is a macro lens, the camera application 30 may use this information to perform focus sweeping and/or multi-image fusion to create macro images with extended depth of field.

FIGS. 2 and 3 illustrate examples of different types of actuators that may be used in a camera system to adjust the camera lens according to alignment, spacing, and tilt relative to the accessory lens, with FIG. 2 showing an example mechanical actuator that mechanically adjusts the camera lens and FIG. 3 showing an example optical actuator that optically adjusts the camera lens.

FIG. 2 illustrates an example mechanical actuator that mechanically adjusts the camera lens of a small form factor camera, according to some embodiments. To achieve autofocus (AF) and/or optical image stabilization (OIS) functionality in small form factor cameras, a mechanical solution such as VCM (voice coil motor) technology that moves the lens module in relation to the image plane in the Z (optical axis) direction for AF and either by tilting or displacing the lens module in the X and Y (perpendicular to the Z axis) directions for OIS may be used. FIG. 2 illustrates motion of a camera lens 112 under control of an example mechanical actuator component 114 that provides mechanical autofocus (AF) and/or optical image stabilization (OIS) functionality for a camera module 110. The actuator component 114 may, for example, include a VCM actuator mechanism. The actuator component 114 may, for example, be mounted to a substrate that includes a photosensor 150 of the camera. The actuator component 114 may provide motion to camera lens 112 on the Z (optical) axis and/or in the XY plane. The XY plane motion may, for example, provide optical image stabilization (OIS) by moving the camera lens 112 on the X and/or Y axis relative to the photosensor 150. The Z axis motion may, for example, provide optical focusing or autofocus for the camera by moving the camera lens 112 on the Z axis relative to the photosensor 150.

FIG. 2 illustrates components of an example SFF camera system in a device 100 that provides X, Y and Z motions for the camera lens 112 via a mechanical actuator component 114 that may be used to adjust the camera lens 112 for presence of an accessory lens 180, according to some embodiments. In this example, the SFF camera system may include a camera module 110 integrated into a device 100, with the camera module 110 including a camera lens 112 that is coupled to an actuator component 114, for example by upper and/or lower springs. The camera lens 112 may include a lens barrel that includes a stack of lens elements. The actuator component 114 may, for example, include magnets used in a VCM actuator mechanism. The springs may be flexible to allow motion of the camera lens 112 on the Z axis relative to a photosensor 150 within the camera module 110. The actuator component 114 may be configured to move the camera lens 112 on the Z axis within the camera module 110 and relative to the photosensor 150, for example to provide focusing or autofocus for the camera. An assembly which includes at least the camera lens 112, actuator component 114, and springs may be suspended within the camera module 110 on two or more suspension wires. For example, the suspension wires may be mounted to a base of the camera module 110 in the device 100, and the assembly may be suspended on the wires at the outer portion of the upper springs. The suspension wires may be flexible to allow motion of the assembly, and thus of the camera lens 112, on the XY axes orthogonal to the Z (optical) axis of the camera lens 112. The actuator component 114 may be configured to move the camera lens 112 on the XY axes within the camera module 110 and relative to the photosensor 150, for example to provide optical image stabilization (OIS) for the camera. A cover for the assembly may be attached to the base of the camera module 110. The assembled camera module 110 may, for example, be mounted to a substrate in device 100 that includes a photosensor 150 for the camera.

The camera module 110 and/or device 100 may include one or more processors 120 that implement camera control 124, image analysis 122, and image processing 126 software (collectively referred to as a camera application) of the SFF camera system.

In some embodiments, the camera application may determine that an accessory lens 180 is attached to the camera module 110. In some embodiments, sensing technology, for example electrical, magnetic, optical, or radio frequency (RF) sensing technology, may be built into an accessory lens 180 and device 100, and presence of the accessory lens 180 may be detected using a sensing technology interface, for example an electrical, magnetic, optical, or radio frequency (RF) sensing technology interface. In some embodiments, an accessory lens 180 may not include sensing technology, and presence of the accessory lens 180 may instead be detected by image analysis 122 software that analyzes image data captured by the photosensor 150 to detect that one or more image metrics (e.g., sharpness, relative illumination, optical distortion, chromatic aberration, magnification, vignetting, Fourier spectrum, and/or field of curvature) have changed from known (e.g., calibrated) image metrics for image data captured using the camera lens 112 without an accessory lens 180.

In some embodiments, the actuator 114, under control of the camera application, may be used to align the optical axis of the camera lens 112 with the optical axis of the accessory lens 180. In some embodiments, the actuator 114, under control of the camera application, may be used to adjust spacing between the camera lens 112 and the accessory lens 180. In some embodiments, the actuator 114, under control of the camera application, may be used to tilt the camera lens 112 to compensate for tilt of the accessory lens 180. In some embodiments, image analysis 122 software measures one or more image metrics (e.g., sharpness, illumination, vignetting, Fourier spectrum, etc.) from one or more images captured by the photosensor 150 of the SFF camera system using the accessory lens 180, and applies a feedback/optimization algorithm that adjusts the position (axis alignment, spacing, and/or tilt) of the camera lens 112 with respect to the accessory lens 180 using the functionalities provided by the actuator 114 such that quality of the measured image metric(s) are maximized. In some embodiments, the image analysis 122 software determines alignment information for the camera lens 112, and communicates the alignment information to camera control 124 software, which then directs the actuator component 114 to align the camera lens 112 with the accessory lens 180 accordingly.

In some embodiments, the camera application may obtain or estimate one or more optical characteristics of an accessory lens 180 such as focal length or focal range. In some embodiments, the obtained or estimated optical characteristics of the accessory lens 180 may, for example, be used to enable special user interface (UI) elements, as input to image processing 126 software, and/or to instantiate special image processing 126 software that take advantage of or compensate for the optical characteristics of the accessory lens 180. In some embodiments, one or more optical characteristics (e.g., focal length, focus distance/range, image circle diameter, aberration parameters, etc.) of the accessory lens 180 may be obtained by the camera application via a sensing technology interface to the accessory lens 180, or may be obtained (e.g., as a lens profile) from an external source such as the accessory lens manufacturer. In some embodiments, one or more optical characteristics (e.g., focal length, focus distance/range, image circle diameter, aberration parameters, etc.) of the accessory lens 180 may be estimated by the image analysis 122 software by analyzing captured image data to detect change in one or more optical characteristics (e.g., focal length and/or focal distance/range) from known (e.g., calibrated) optical characteristics for the camera lens 112. For example, in cases where the accessory lens 180 changes the focal length of the camera system, the camera system focal length may be estimated by analyzing how features in two or more captured images (e.g., frames in a video stream) move as the device 100 is rotated and correlating the speed of the image motion to motion data determined by motion sensing technology of the device 100. As another example, in the case of a macro accessory lens 180 (where both the system focal length and focus distance are changed), the focus distance/range may be estimated by applying known amounts of defocus of the camera lens 112 via the actuator component 114 and by calculating the rate at which the image magnification changes to infer the focus distance.

As noted above, the obtained or estimated optical characteristics of the accessory lens 180 may be used as input to image processing 126 software and/or to instantiate special image processing 126 software that takes advantage of the specifics of the accessory lens 180. As an example, if the obtained or estimated optical characteristics of the accessory lens 180 indicate that the accessory lens 180 is a wide-angle or fish-eye adapter lens that introduces significant vignetting in the corners of the image, image processing 126 software may use this information to automatically crop images captured by the photosensor 150 to prevent vignetting. As another example, if the obtained or estimated optical characteristics of the accessory lens 180 indicate that the accessory lens 180 is a macro lens, the image processing 126 software may use this information to perform focus sweeping and/or multi-image fusion to create macro images with extended depth of field.

FIG. 3 illustrates a camera module 210 in a device 200 with a fixed camera lens 212 and an optical actuator 214 component that provides autofocus (AF), tilt, and/or optical image stabilization (OIS) functionality for the SFF camera system, and that may be used to adjust the camera lens 212 for presence of an accessory lens 280, according to some embodiments. The camera module 210 may include an optical actuator 214, for example an optical microelectromechanical system (MEMS), and a camera lens 212 including one or more refractive lens elements, also referred to as a lens stack. The camera lens 212 may be mounted or affixed inside a holder 216; the holder 216 and camera lens 212 assembly may collectively be referred to as a lens barrel. The optical actuator 214 may be located on or within the holder 216 on the object side of the camera lens 212 in front of a first lens of the stack, while the photosensor 250 is located on the image side of the lens stack when the lens barrel is attached to a substrate in device 200 that holds the photosensor 250. In some embodiments, the optical actuator 214 may include, but is not limited to, a substrate (e.g., a clear glass or plastic substrate), a flexible optical element (e.g., a flexible lens), and an actuator component that is configured to change the shape of the flexible optical element to provide adaptive optical functionality for the camera without physically moving the camera lens 212 as is done in the camera system of FIG. 2; the camera lens 212 and optical actuator 214 are fixed and stay stationary in the holder 216, and the assembly is fixed to the substrate in the device 200. The optical functionality provided by the optical actuator 214 may include autofocus (AF) functionality, tilt, and/or optical image stabilization (OIS) functionality, for example. The optical actuator 214 may also be referred to as an SSAF (Solid-State Auto-Focus) and/or SSOIS (Solid-State Optical Image Stabilization) component or module. The AF and/or OIS functionality for the camera is provided by the optical actuator 214 changing the shape of the flexible optical element to affect light rays passing from the object field through the flexible optical element to the camera lens 212, rather than by physically moving the camera lens as in the camera system of FIG. 2.

The camera module 210 and/or device 200 may include one or more processors 220 that implement camera control 224, image analysis 222, and image processing 226 software (collectively referred to as a camera application) of the SFF camera system.

In some embodiments, the camera application may determine that an accessory lens 280 is attached to the camera module 210. In some embodiments, sensing technology, for example electrical, magnetic, optical, or radio frequency (RF) sensing technology, may be built into an accessory lens 280 and device 200, and presence of the accessory lens 280 may be detected using a sensing technology interface, for example an electrical, magnetic, optical, or radio frequency (RF) sensing technology interface. In some embodiments, an accessory lens 280 may not include sensing technology, and presence of the accessory lens 280 may instead be detected by image analysis 222 software that analyzes image data captured by the photosensor 250 to detect that one or more image metrics (e.g., sharpness, relative illumination, optical distortion, chromatic aberration, magnification, vignetting, Fourier spectrum, and/or field of curvature) have changed from known (e.g., calibrated) image metrics for image data captured using the camera lens 212 without an accessory lens 280.

In some embodiments, the optical actuator 214, under control of the camera application, may be used to align the optical axis of the camera lens 212 with the optical axis of the accessory lens 280. In some embodiments, the optical actuator 214, under control of the camera application, may be used to adjust spacing between the camera lens 212 and the accessory lens 280. In some embodiments, the optical actuator 214, under control of the camera application, may be used to tilt the camera lens 212 to compensate for tilt of the accessory lens 280. In some embodiments, image analysis 222 software measures one or more image metrics (e.g., sharpness, illumination, vignetting, Fourier spectrum, etc.) from one or more images captured by the photosensor 250 of the SFF camera system using the accessory lens 280, and applies a feedback/optimization algorithm that adjusts the position (axis alignment, spacing, and/or tilt) of the camera lens 212 with respect to the accessory lens 280 using the functionalities provided by the optical actuator 214 such that quality of the measured image metric(s) are maximized. In some embodiments, the image analysis 222 software determines alignment information for the camera lens 212, and communicates the alignment information to camera control 224 software, which then directs the optical actuator 214 to adjust the flexible optical element to align the camera lens 212 with the accessory lens 280 accordingly.

In some embodiments, the camera application may obtain or estimate one or more optical characteristics of an accessory lens 280 such as focal length or focal range. In some embodiments, the obtained or estimated optical characteristics of the accessory lens 280 may, for example, be used to enable special user interface (UI) elements, as input to image processing 226 software, and/or to instantiate special image processing 226 software that take advantage of or compensate for the optical characteristics of the accessory lens 280. In some embodiments, one or more optical characteristics (e.g., focal length, focus distance/range, image circle diameter, aberration parameters, etc.) of the accessory lens 280 may be obtained by the camera application via a sensing technology interface to the accessory lens 280, or may be obtained (e.g., as a lens profile) from an external source such as the accessory lens manufacturer. In some embodiments, one or more optical characteristics (e.g., focal length, focus distance/range, image circle diameter, aberration parameters, etc.) of the accessory lens 280 may be estimated by the image analysis 222 software by analyzing captured image data to detect change in one or more optical characteristics (e.g., focal length and/or focal distance/range) from known (e.g., calibrated) optical characteristics for the camera lens 212. For example, in cases where the accessory lens 280 changes the focal length of the camera system, the camera system focal length may be estimated by analyzing how features in two or more captured images (e.g., frames in a video stream) move as the device 200 is rotated and correlating the speed of the image motion to motion data determined by motion sensing technology of the device 200. As another example, in the case of a macro accessory lens 280 (where both the system focal length and focus distance are changed), the focus distance/range may be estimated by applying known amounts of defocus of the camera lens 212 via the optical actuator 214 and by calculating the rate at which the image magnification changes to infer the focus distance.

As noted above, the obtained or estimated optical characteristics of the accessory lens 280 may be used as input to image processing 226 software and/or to instantiate special image processing 226 software that takes advantage of the specifics of the accessory lens 280. As an example, if the obtained or estimated optical characteristics of the accessory lens 280 indicate that the accessory lens 280 is a wide-angle or fish-eye adapter lens that introduces significant vignetting in the corners of the image, image processing 226 software may use this information to automatically crop images captured by the photosensor 250 to prevent vignetting. As another example, if the obtained or estimated optical characteristics of the accessory lens 280 indicate that the accessory lens 280 is a macro lens, the image processing 226 software may use this information to perform focus sweeping and/or multi-image fusion to create macro images with extended depth of field.

FIG. 4A graphically illustrates optical axis alignment in an SFF camera system with an accessory lens 480 attached, according to some embodiments. In some embodiments, an actuator as illustrated in FIG. 2 or FIG. 3 may provide optical image stabilization (OIS) functionality that, under control of the camera application, may be used to shift the optical axis of the camera lens 412 on one or more axes (referred to as X and Y axes) orthogonal to the optical (Z) axis of the camera lens 412 to align the optical axis of the camera lens 412 with the optical axis of an accessory lens 480.

FIG. 4B graphically illustrates lens spacing adjustment in an SFF camera system with an accessory lens 480 attached, according to some embodiments. In some embodiments, an actuator as illustrated in FIG. 2 or FIG. 3 may provide autofocus (AF) functionality that, under control of the camera application, may be used to shift the camera lens 412 up or down on the optical (Z) axis to adjust spacing between the camera lens 412 and an accessory lens 480.

FIG. 4C graphically illustrates tilt adjustment in an SFF camera system with an accessory lens 480 attached, according to some embodiments. In some embodiments, an actuator as illustrated in FIG. 2 or FIG. 3 may provide tilt functionality that, under control of the camera application, may be used to tilt the camera lens 412 to compensate for tilt of the accessory lens 480.

FIGS. 5 through 10 are flowcharts of methods that may be implemented in SFF camera systems, for example as illustrated in any of FIGS. 1A through 3, to adapt the camera systems to accessory lenses attached to the cameras.

Figure 5:
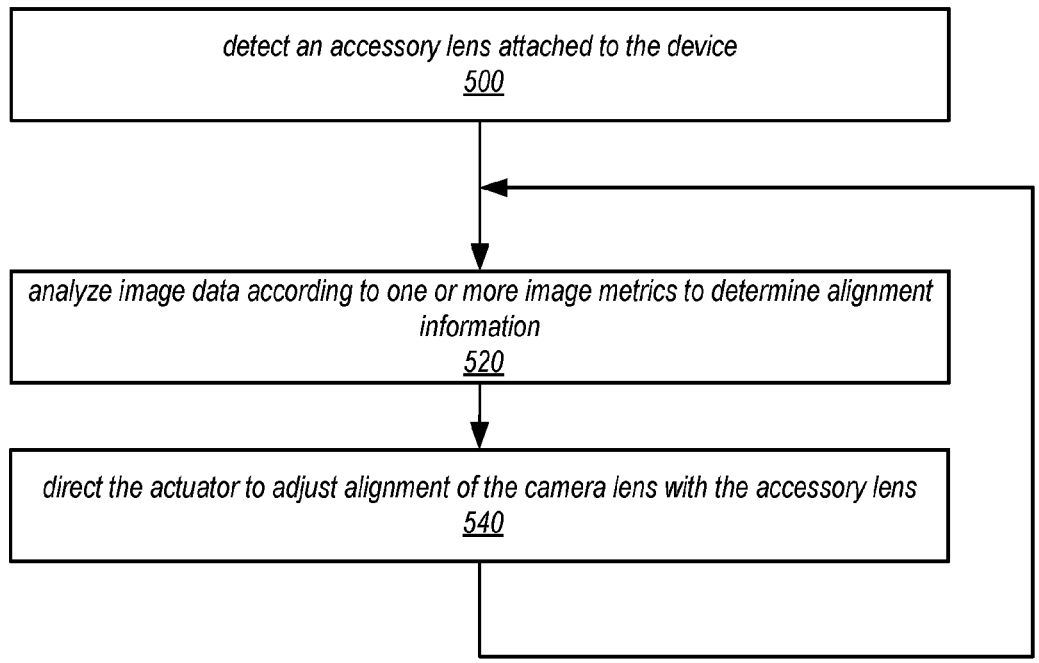
FIG. 5 is a high-level flowchart of a method for aligning a camera lens with an accessory lens, according to some embodiments.

FIG. 5 is a high-level flowchart of a method for aligning a camera lens of a SFF camera in a device with an accessory lens attached to the camera, according to some embodiments. As indicated at 500, an accessory lens attached to the device may be detected. In some embodiments, presence of an accessory lens may be detected using a sensing technology interface between the accessory lens and the SFF camera, for example an electrical, magnetic, optical, or radio frequency (RF) sensing technology interface. In some embodiments, presence of an accessory lens may be detected by a camera application by analyzing captured image data to detect that one or more image metrics (e.g., focus, sharpness, relative illumination, optical distortion, chromatic aberration, magnification, vignetting, a Fourier spectrum of the image, and/or field of curvature) have changed from known (e.g., calibrated) image metrics for the camera lens. Other methods for detecting presence of an accessory lens may be used.

As indicated at 520, the camera application may analyze image data according to one or more image metrics to determine alignment information. As indicated at 540, the camera application may direct the actuator to adjust alignment of the camera lens with the accessory lens. In some embodiments, the camera application measures one or more image metrics (e.g., sharpness, illumination, vignetting, Fourier spectrum, etc.) from one or more images captured by the SFF camera using the accessory lens, and applies a feedback/optimization algorithm that adjusts the position (optical axis alignment, spacing, and/or optical axis tilt) of the camera lens with respect to the accessory lens using the functionalities provided by an actuator mechanism of the SFF camera such that measured image metric(s) are maximized. In some embodiments, the camera application may detect that the optical axis of the accessory lens is decentered (not aligned with the optical axis of the camera lens), and may direct the actuator to shift the optical axis of the camera lens on one or more axes orthogonal to the optical axis to align the optical axis of the camera lens with the optical axis of the accessory lens so that the two axes are collinear. In some embodiments, the camera application may detect that spacing between the accessory lens and the camera lens is not correct, and may direct the actuator to shift the camera lens up or down along the optical axis to adjust spacing between the camera lens and the accessory lens so that optimal focusing is obtained. In some embodiments, the camera application may detect that the optical axis of the accessory lens is tilted with respect to the optical axis of the camera lens, and may direct the actuator to tilt the optical axis of the camera lens so that the optical axis of the camera lens is aligned with the optical axis of the accessory lens.

The arrow leading back from 540 to 520 indicates that the method is a feedback/optimization algorithm that adjusts the position (optical axis alignment, spacing, and/or optical axis tilt) of the camera lens with respect to the accessory lens using the functionalities provided by an actuator mechanism of the SFF camera such that measured image metric(s) are maximized. Using optical axis alignment as an example, in some embodiments, the algorithm may determine an initial direction and distance to shift the optical axis of the camera lens, shift the optical axis of the camera lens according to the determined direction and distance, re-evaluate the image metric (e.g., image sharpness, illumination, etc.) being analyzed, determine a direction and distance to shift the optical axis, and continue this process until a quality measurement of the image metric has been maximized.

Figure 6:
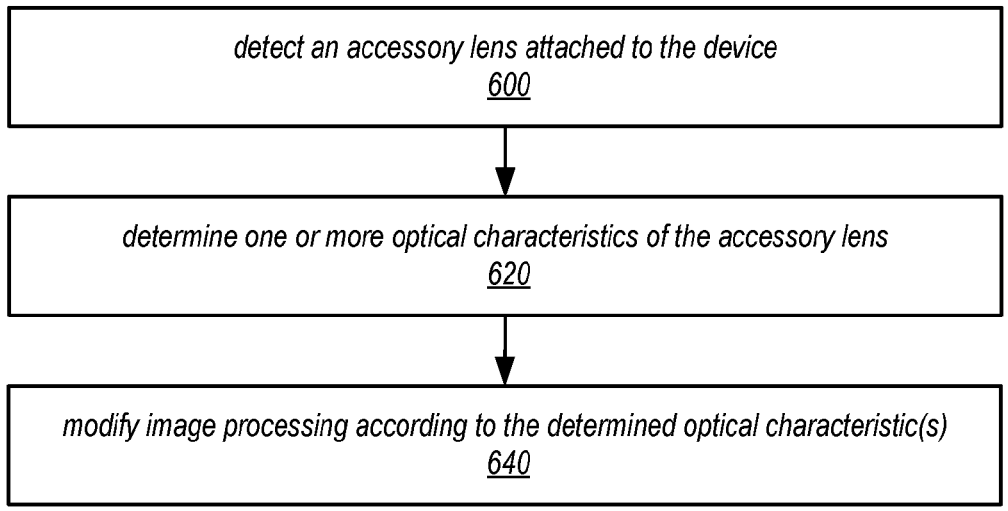
FIG. 6 is a high-level flowchart of a method for adapting image processing according to optical characteristics of an accessory lens, according to some embodiments.

FIG. 6 is a high-level flowchart of a method for adapting image processing according to optical characteristics of an accessory lens, according to some embodiments. As indicated at 600, an accessory lens attached to the device may be detected. In some embodiments, presence of an accessory lens may be detected using a sensing technology interface between the accessory lens and the device, for example an electrical, magnetic, optical, or radio frequency (RF) sensing technology interface. In some embodiments, presence of an accessory lens may be detected by a camera application by analyzing captured image data to detect that one or more image metrics (e.g., focus, sharpness, relative illumination, optical distortion, chromatic aberration, magnification, vignetting, a Fourier spectrum of the image, and/or field of curvature) have changed from known (e.g., calibrated) image metrics for the camera lens. Other methods for detecting presence of an accessory lens may be used.

As indicated at 620, the camera application may determine one or more optical characteristics of the accessory lens such as focal length or focal distance/range. In some embodiments, one or more optical characteristics of the accessory lens may be obtained via a sensing technology interface between the accessory lens and the SFF camera, or alternatively may be obtained (e.g., as a lens profile) from an external source such as the accessory lens manufacturer. In some embodiments, one or more optical characteristics of the accessory lens may be estimated by analyzing captured image data to detect change in one or more optical characteristics (e.g., focal length or focal distance/range) from known (e.g., calibrated) optical characteristics for the camera lens. For example, in cases where the accessory lens changes the focal length of the camera system, the camera system focal length may be estimated by analyzing how features in two or more captured images (e.g., frames in a video stream) move as the device is rotated and correlating the speed of the image motion to motion data determined by motion sensing technology of the device. As another example, in the case of a macro accessory lens (where both the system focal length and focus distance are changed), the focus distance/range may be estimated by applying known amounts of defocus of the camera lens and by calculating the rate at which the image magnification changes to infer the focus distance.

As indicated at 640, the camera application may modify image processing according to the determined optical characteristic(s). In some embodiments, the obtained or estimated optical characteristics of the accessory lens may, for example, be used to enable special user interface (UI) elements on the device, as input to image processing algorithms, and/or to instantiate special image processing algorithms that take advantage of or compensate for the optical characteristics of the accessory lens. As an example, if the obtained or estimated optical characteristics of the accessory lens indicate that the accessory lens is a wide-angle or fish-eye adapter lens that introduces significant vignetting in the corners of the image, the camera application may use this information to automatically crop images captured by the photosensor to prevent vignetting. As another example, if the obtained or estimated optical characteristics of the accessory lens indicate that the accessory lens is a macro lens, the camera application may use this information to perform focus sweeping and/or multi-image fusion to create macro images with extended depth of field.

Figure 7:
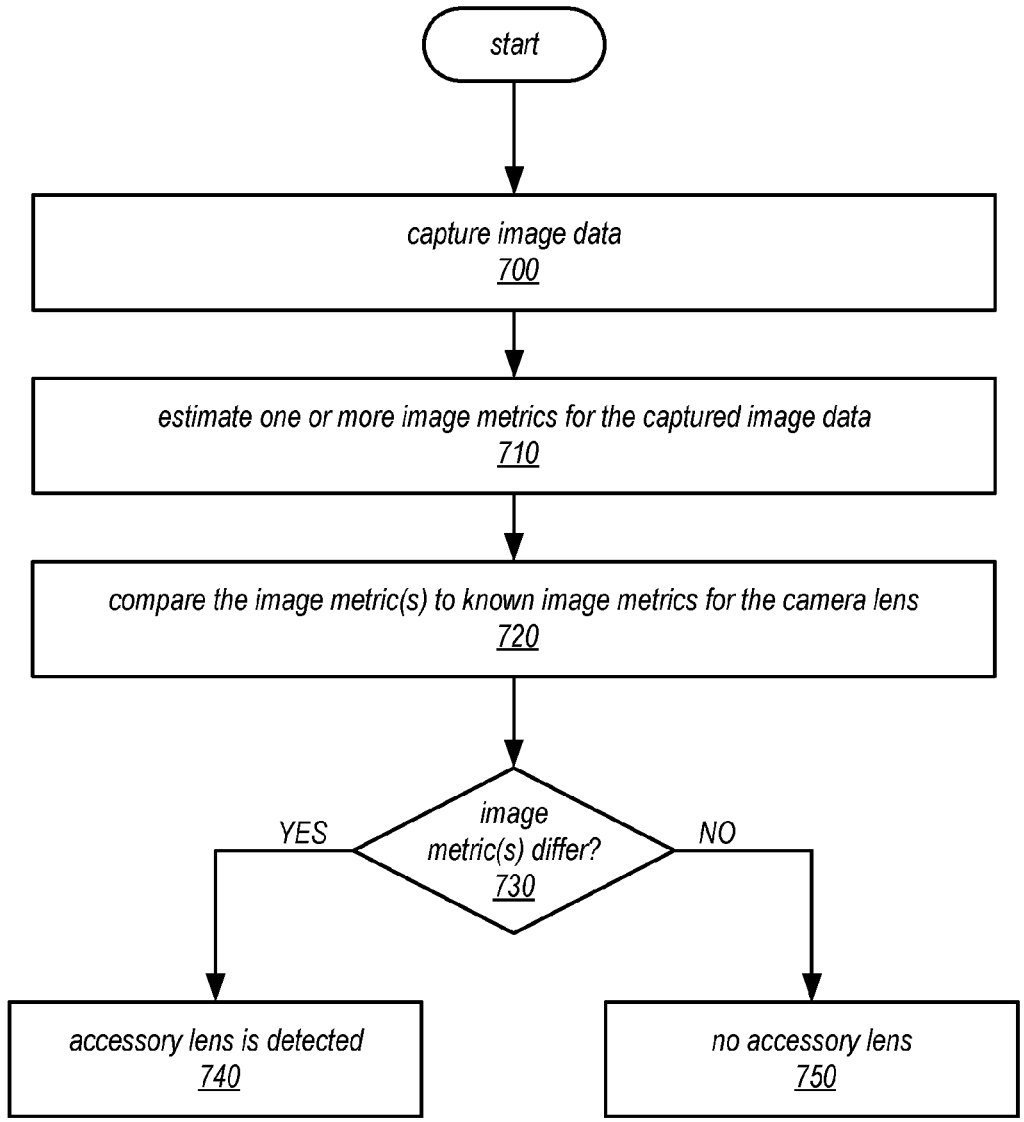
FIG. 7 is a flowchart of a method for detecting presence of an accessory lens, according to some embodiments.

FIG. 7 is a flowchart of a method for detecting presence of an accessory lens, according to some embodiments. The method of FIG. 7 may, for example, be used at element 500 of FIG. 5 or element 600 of FIG. 6 in cases where an accessory lens does not include a sensing technology interface. As indicated at 700, image data may be captured by the camera. As indicated at 710, the camera application may estimate one or more image metrics for the captured image data. For example, in some embodiments, the camera application may analyze image data captured with the accessory lens to estimate one or more image metrics (e.g., focus, sharpness, relative illumination, optical distortion, chromatic aberration, magnification, vignetting, Fourier spectrum, and/or field of curvature) for the image data. As indicated at 720, the camera application may compare the image metric(s) to known image metrics for the camera lens, for example as determined during a calibration process. At 730, if the image metric(s) that were estimated for the accessory lens differ from the known image metric(s) for the camera lens, then an accessory lens is detected as indicated at 740. Otherwise, an accessory lens is not present, as indicated at 750.

In some embodiments, a similar method may be used to automatically detect when an accessory lens has been removed from the SFF camera.

Figure 8:
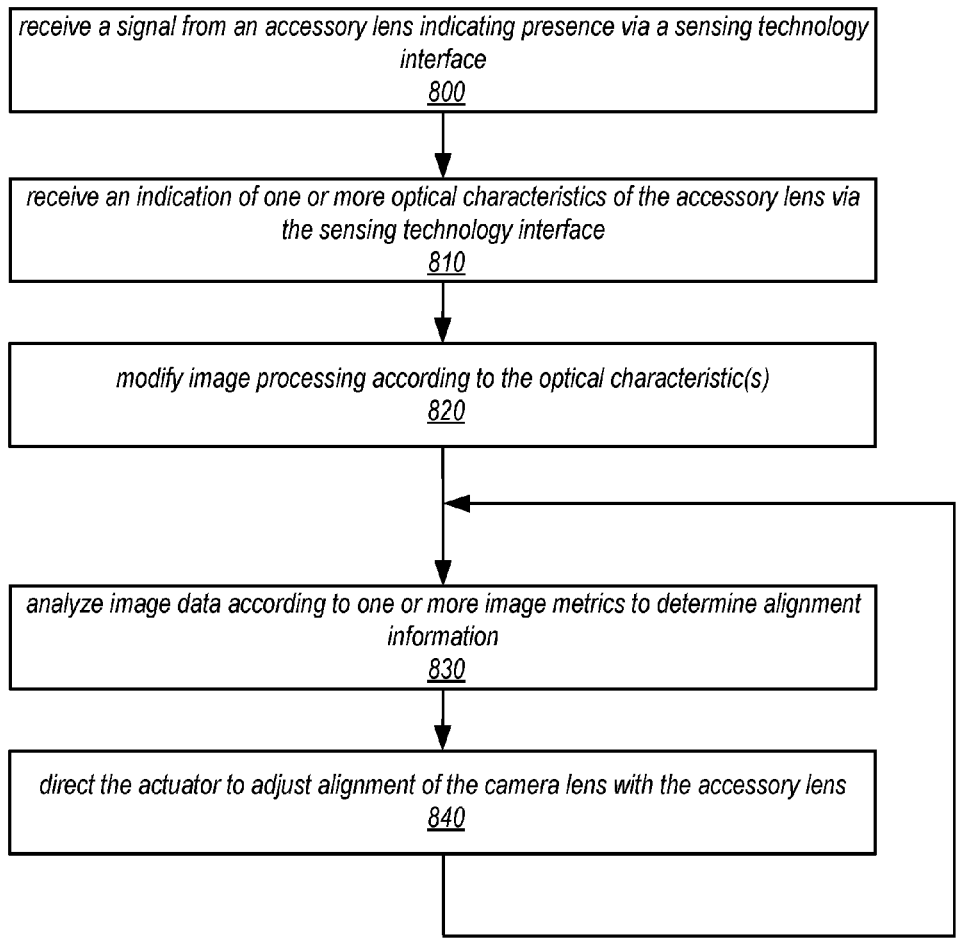
FIG. 8 is a flowchart of a method for adapting a camera system to an accessory lens that includes sensing technology, according to some embodiments.

FIG. 8 is a flowchart of a method for adapting a camera system to an accessory lens that includes sensing technology, according to some embodiments. As indicated at 800, the device may receive a signal from an accessory lens indicating presence of the accessory lens via a sensing technology interface, for example an electrical, magnetic, optical, or radio frequency (RF) sensing technology interface. As indicated at 810, the camera application may receive an indication of one or more optical characteristics (e.g., focal length, focus distance/range, image circle diameter, aberration parameters, etc.) of the accessory lens via the sensing technology interface. Instead or in addition, one or more optical characteristics of the accessory lens may be obtained (e.g., as a lens profile) from an external source such as the accessory lens manufacturer.

As indicated at 820, the camera application may modify image processing according to the optical characteristic(s) of the accessory lens. In some embodiments, the obtained optical characteristics of the accessory lens may, for example, be used to enable special user interface (UI) elements on the device, as input to image processing algorithms, and/or to instantiate special image processing algorithms that take advantage of or compensate for the optical characteristics of the accessory lens.

As indicated at 830, the camera application may analyze image data according to one or more image metrics to determine alignment information. As indicated at 840, the camera application may direct the actuator to adjust alignment of the camera lens with the accessory lens. In some embodiments, the camera application measures one or more image metrics (e.g., sharpness, illumination, vignetting, Fourier spectrum, etc.) from one or more images captured by the SFF camera using the accessory lens, and applies a feedback/optimization algorithm that adjusts the position (optical axis alignment, spacing, and/or optical axis tilt) of the camera lens with respect to the accessory lens using the functionalities provided by an actuator mechanism of the SFF camera such that measured image metric(s) are maximized. In some embodiments, the camera application may detect that the optical axis of the accessory lens is decentered (not aligned with the optical axis of the camera lens), and may direct the actuator to shift the optical axis of the camera lens on one or more axes orthogonal to the optical axis to align the optical axis of the camera lens with the optical axis of the accessory lens so that the two axes are collinear. In some embodiments, the camera application may detect that spacing between the accessory lens and the camera lens is not correct, and may direct the actuator to shift the camera lens up or down along the optical axis to adjust spacing between the camera lens and the accessory lens so that optimal focusing is obtained. In some embodiments, the camera application may detect that the optical axis of the accessory lens is tilted with respect to the optical axis of the camera lens, and may direct the actuator to tilt the optical axis of the camera lens so that the optical axis of the camera lens is aligned with the optical axis of the accessory lens.

The arrow leading back from 840 to 830 indicates that the alignment method is a feedback/optimization algorithm that adjusts the position (optical axis alignment, spacing, and/or optical axis tilt) of the camera lens with respect to the accessory lens using the functionalities provided by an actuator mechanism of the SFF camera such that measured image metric(s) are maximized. Using optical axis alignment as an example, in some embodiments, the algorithm may determine an initial direction and distance to shift the optical axis of the camera lens, shift the optical axis of the camera lens according to the determined direction and distance, re-evaluate the image metric (e.g., image sharpness, illumination, etc.) being analyzed, determine a direction and distance to shift the optical axis, and continue this process until a quality measurement of the image metric has been maximized.

Figure 9:
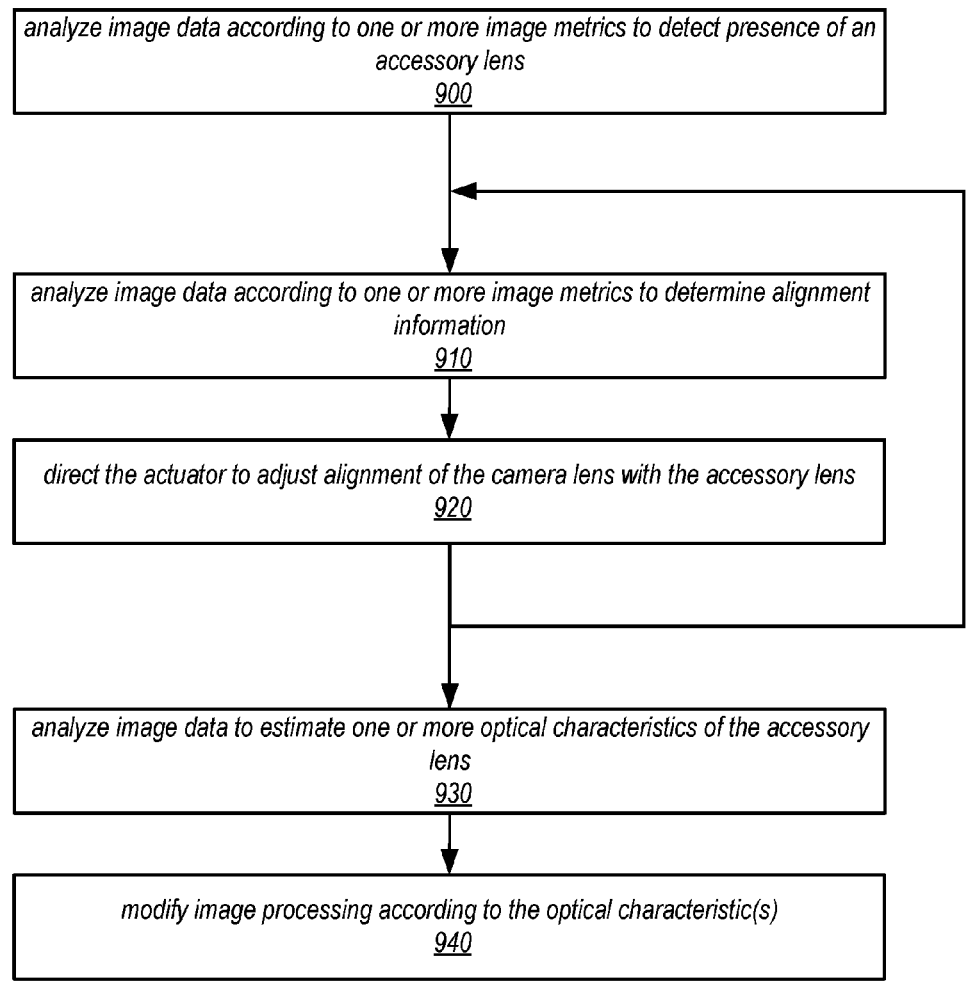
FIG. 9 is a flowchart of a method for adapting a camera system to an accessory lens that does not include sensing technology, according to some embodiments.

FIG. 9 is a flowchart of a method for adapting a camera system to an accessory lens that does not include sensing technology, according to some embodiments. As indicated at 900, the camera application may analyze image data according to one or more image metrics to detect presence of an accessory lens, for example using a method as illustrated in FIG. 7.

Once an accessory lens is detected, then as indicated at 910, the camera application may analyze image data according to one or more image metrics to determine alignment information. As indicated at 920, the camera application may direct the actuator to adjust alignment of the camera lens with the accessory lens. In some embodiments, the camera application measures one or more image metrics (e.g., sharpness, illumination, vignetting, Fourier spectrum, etc.) from one or more images captured by the SFF camera using the accessory lens, and applies a feedback/optimization algorithm that adjusts the position (optical axis alignment, spacing, and/or optical axis tilt) of the camera lens with respect to the accessory lens using the functionalities provided by an actuator mechanism of the SFF camera such that measured image metric(s) are maximized. In some embodiments, the camera application may detect that the optical axis of the accessory lens is decentered (not aligned with the optical axis of the camera lens), and may direct the actuator to shift the optical axis of the camera lens on one or more axes orthogonal to the optical axis to align the optical axis of the camera lens with the optical axis of the accessory lens so that the two axes are collinear. In some embodiments, the camera application may detect that spacing between the accessory lens and the camera lens is not correct, and may direct the actuator to shift the camera lens up or down along the optical axis to adjust spacing between the camera lens and the accessory lens so that optimal focusing is obtained. In some embodiments, the camera application may detect that the optical axis of the accessory lens is tilted with respect to the optical axis of the camera lens, and may direct the actuator to tilt the optical axis of the camera lens so that the optical axis of the camera lens is aligned with the optical axis of the accessory lens.

The arrow leading back from 920 to 910 indicates that the alignment method is a feedback/optimization algorithm that adjusts the position (optical axis alignment, spacing, and/or optical axis tilt) of the camera lens with respect to the accessory lens using the functionalities provided by an actuator mechanism of the SFF camera such that measured image metric(s) are maximized. Using optical axis alignment as an example, in some embodiments, the algorithm may determine an initial direction and distance to shift the optical axis of the camera lens, shift the optical axis of the camera lens according to the determined direction and distance, re-evaluate the image metric (e.g., image sharpness, illumination, etc.) being analyzed, determine a direction and distance to shift the optical axis, and continue this process until a quality measurement of the image metric has been maximized.

Figure 10:
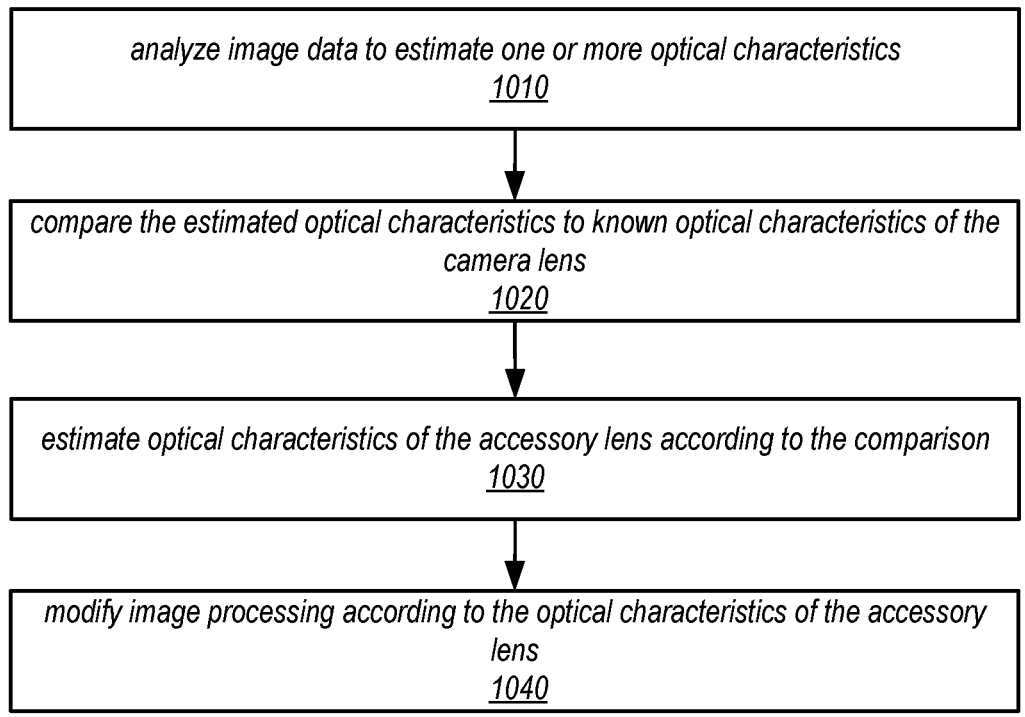
FIG. 10 is a flowchart of a method for estimating optical characteristics of an accessory lens, according to some embodiments.

As indicated at 930, the camera application may analyze image data to estimate one or more optical characteristics of the accessory lens, for example as illustrated in FIG. 10. As indicated at 940, the camera application may modify image processing according to the optical characteristic(s) of the accessory lens. In some embodiments, the obtained optical characteristics of the accessory lens may, for example, be used to enable special user interface (UI) elements on the device, as input to image processing algorithms, and/or to instantiate special image processing algorithms that take advantage of or compensate for the optical characteristics of the accessory lens.

FIG. 10 is a flowchart of a method for estimating optical characteristics of an accessory lens, according to some embodiments. The method of FIG. 7 may, for example, be used at element 500 of FIG. 5 or element 600 of FIG. 6 in cases where an accessory lens does not include a sensing technology interface. As indicated at 1010, the camera application may analyze image data captured using the accessory lens to estimate one or more optical characteristics (e.g., focal length, focus distance/range, image circle diameter, aberration parameters, etc.) from the image data. For example, in cases where the accessory lens changes the focal length of the camera system, the camera system focal length may be estimated by analyzing how features in two or more captured images (e.g., frames in a video stream) move as the device is rotated and correlating the speed of the image motion to motion data determined by motion sensing technology of the device. As another example, in the case of a macro accessory lens (where both the system focal length and focus distance are changed), the focus distance/range may be estimated by applying known amounts of defocus of the camera lens via the actuator and by calculating the rate at which the image magnification changes to infer the focus distance. As indicated at 1020, the camera application may compare the estimated optical characteristic(s) to known optical characteristic(s) of the camera lens, for example as determined during a calibration process. As indicated at 1030, the camera application may estimate one or more optical characteristics of the accessory lens according to the comparison.

As indicated at 1040, the camera application may modify image processing according to the estimated optical characteristics of the accessory lens.). In some embodiments, the estimated optical characteristics of the accessory lens may, for example, be used to enable special user interface (UI) elements on the device, as input to image processing algorithms, and/or to instantiate special image processing algorithms that take advantage of or compensate for the optical characteristics of the accessory lens. As an example, if the estimated optical characteristics of the accessory lens indicate that the accessory lens is a wide-angle or fish-eye adapter lens that introduces significant vignetting in the corners of the image, the camera application may use this information to automatically crop images captured by the photosensor to prevent vignetting. As another example, if the estimated optical characteristics of the accessory lens indicate that the accessory lens is a macro lens, the camera application may use this information to perform focus sweeping and/or multi-image fusion to create macro images with extended depth of field.

FIGS. 11A through 11D graphically illustrate methods for analyzing image data captured using a detected accessory lens according to one or more image metrics (e.g., sharpness, illumination, vignetting, Fourier spectrum, etc.) to determine alignment information, according to some embodiments. For example, the methods may be used to determine that the optical axis of the accessory lens is decentered with respect to the optical axis of the camera lens, and to shift the optical axis of the camera lens so that the two axes are collinear. Similar methods may be used to detect spacing and/or tilt of the accessory lens with respect to the camera lens.

Figure 11A:
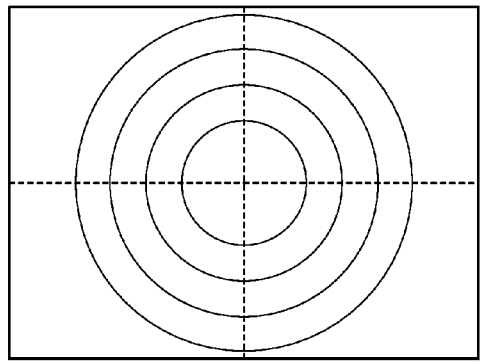
FIGS. 11A through 11D graphically illustrate methods for analyzing image data captured using a detected accessory lens according to one or more image metrics to determine alignment information, according to some embodiments.
Figure 11B:
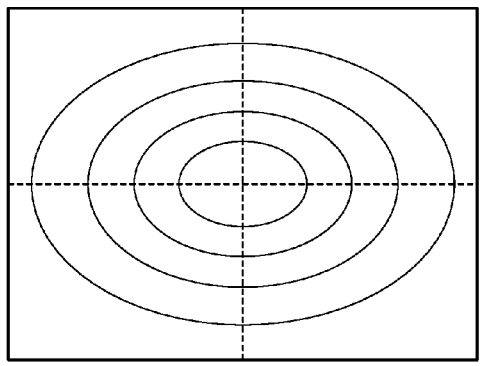
Figure 11C:
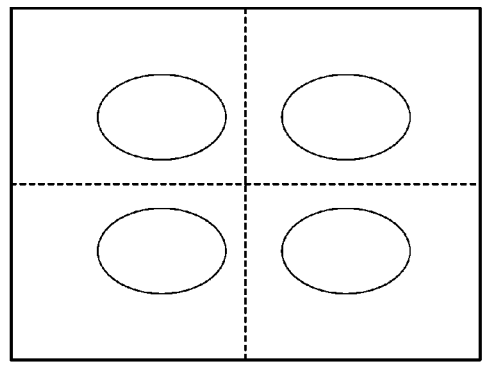
Figure 11D:
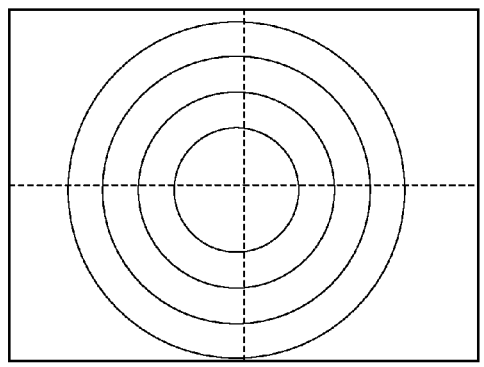

FIG. 11A graphically illustrates a normal or optimal distribution of an image metric such as image sharpness or illumination in an image. As shown in FIG. 11A, optimally, an image metric is distributed in a rotationally symmetric pattern around the center of the image. FIGS. 11B through 11D graphically illustrate example distributions of an image metric that may be detected when the optical axis of the accessory lens is decentered with respect to the optical axis of the camera lens. FIG. 11B illustrates a pattern where the distribution is flattened in one dimension. FIG. 11B illustrates a pattern in which there are multiple local maxima for the image metric. FIG. 11C illustrates a pattern in which the image metric is off-center.

In some embodiments, the alignment method is a feedback/optimization algorithm that adjusts the position (optical axis alignment, spacing, and/or optical axis tilt) of the camera lens with respect to the accessory lens using the functionalities provided by an actuator mechanism of the SFF camera such that quality of the measured image metric(s) are maximized to achieve a normal or optimal distribution as illustrated in FIG. 11A. Using optical axis alignment as an example, in some embodiments, the algorithm may determine an initial direction and distance to shift the optical axis of the camera lens from the analysis of the image data, shift the optical axis of the camera lens according to the determined direction and distance, re-evaluate the image metric (e.g., image sharpness, illumination, etc.) being analyzed, determine a direction and distance to shift the optical axis, and iteratively continue this process until the quality measurement of the image metric has been maximized, and an optimal distribution pattern as illustrated in FIG. 11A has been achieved.

Figure 12:
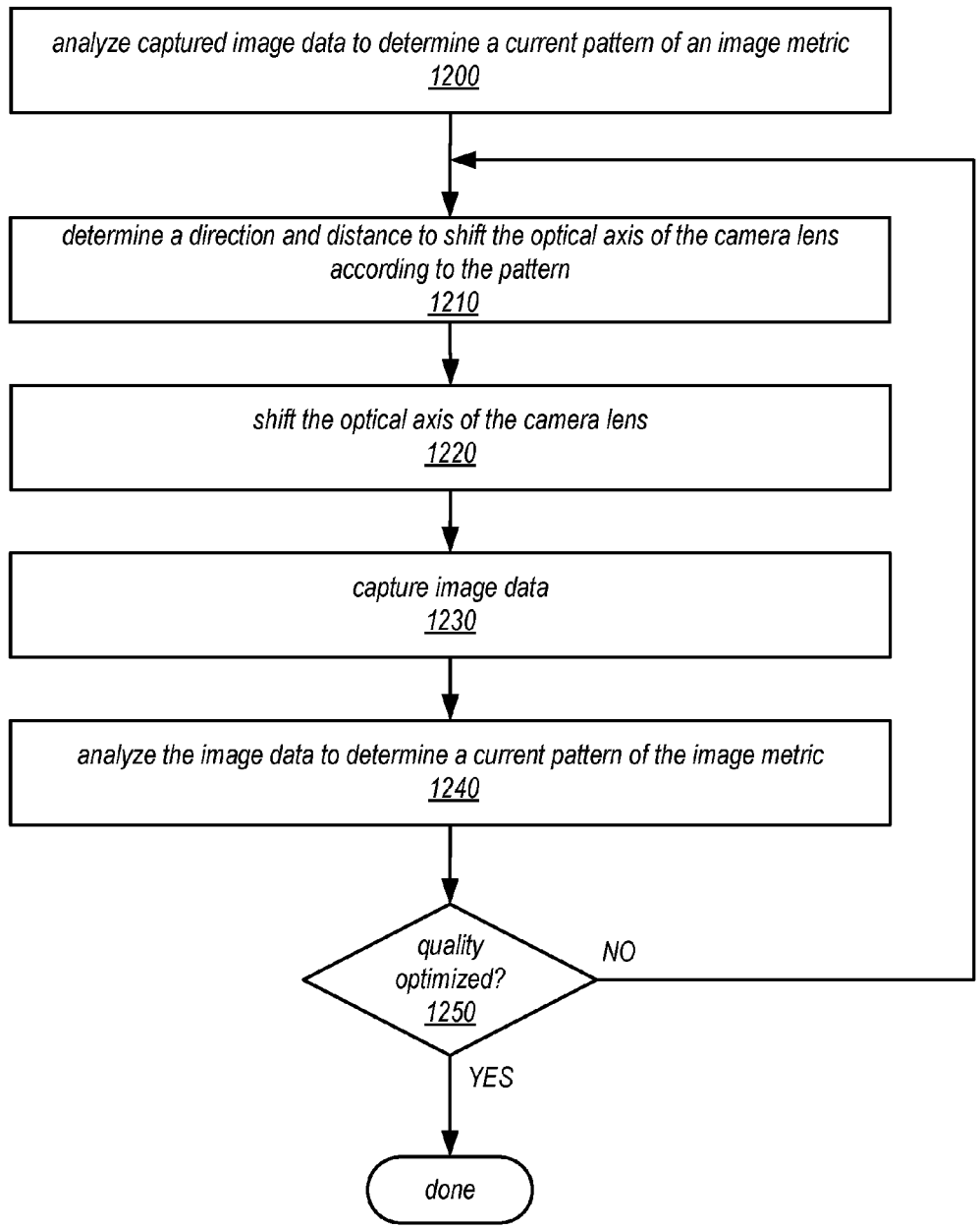
FIG. 12 is a flowchart of a method for analyzing image data captured using a detected accessory lens according to one or more image metrics to align the camera lens with the accessory lens, according to some embodiments.

FIG. 12 is a flowchart of a method for analyzing image data captured using a detected accessory lens according to one or more image metrics (e.g., sharpness, illumination, vignetting, Fourier spectrum, etc.) to align the camera lens with the accessory lens, according to some embodiments. For example, the methods may be used to determine that the optical axis of the accessory lens is decentered with respect to the optical axis of the camera lens, and to shift the optical axis of the camera lens so that the two axes are collinear. Similar methods may be used to detect spacing and/or tilt of the accessory lens with respect to the camera lens.

As indicated at 1200, a camera application may analyze image data captured using an accessory lens to determine a current pattern of an image metric, for example as illustrated in FIGS. 11A through 11D. As indicated at 1210, the camera application may determine a direction and distance to shift the optical axis of the camera lens according to the pattern. As indicated at 1220, the camera application may direct an actuator of the camera to shift the optical axis of the camera lens according to the determined direction and distance. As indicated at 1230, additional image data may be captured by the camera. As indicated at 1240, the camera application may analyze the new image data to determine a current pattern of the image metric. If quality of the image metric has been optimized (e.g., to within some minimum threshold for a rotationally symmetric pattern as illustrated in FIG. 11A), then the method is done. Otherwise, the method returns to element 1210.

Example Computing Device

FIG. 13 illustrates an example computing device, referred to as computer system 2000, that may include or host embodiments of an SFF camera system as illustrated in FIGS. 1 through 12. In addition, computer system 2000 may implement methods for controlling operations of the camera, for analyzing image data captured with the camera, and/or for performing image processing of images captured with the camera. In different embodiments, computer system 2000 may be any of various types of devices, including, but not limited to, a personal computer system, desktop computer, laptop, notebook, tablet or pad device, slate, or netbook computer, handheld computer, workstation, network computer, a camera, a set top box, a mobile device, a wireless phone, a smartphone, a consumer device, video game console, handheld video game device, a video recording device, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more SFF cameras as described above with respect to FIGS. 1 through 12, which may also be coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 12, memory 2020 may include program instructions 2022, which may be processor-executable to implement any element or action to support integrated camera 2090, including but not limited to image analysis software, image processing software, and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, solid-state or flash memory media such as USB flash drives, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a camera comprising a photosensor and a camera lens, wherein the camera includes an actuator configured to adjust the camera lens with respect to the photosensor on one or more axes orthogonal to an optical axis of the camera lens; and
   one or more processors configured to:
     detect an accessory lens attached to the camera;
     determine one or more image metrics from image data captured by the camera using the accessory lens;
     determine a current position of an optical axis of the accessory lens with respect to the optical axis of the camera lens according to at least one of the one or more image metrics; and
     direct the actuator to adjust the camera lens on at least one of the one or more axes orthogonal to the optical axis of the camera lens to improve alignment of the optical axis of the camera lens with the optical axis of the accessory lens.

2. The system as recited in claim 1, wherein the one or more image metrics include one or more of sharpness, relative illumination, optical distortion, chromatic aberration, vignetting, magnification, and field of curvature.

3. The system as recited in claim 1, wherein the one or more processors are further configured to:
   analyze the image data captured by the camera using the accessory lens to determine one or more optical characteristics of the accessory lens; and
   apply one or more image processing functions to image data captured using the accessory lens according to the determined optical characteristics of the accessory lens.

4. The system as recited in claim 3, wherein the one or more optical characteristics include one or more of focal length, focal range, image circle diameter, or aberration parameters of the accessory lens of the accessory lens.

5. The system as recited in claim 1, wherein the actuator is further configured to adjust the camera lens on an axis perpendicular to the photosensor, wherein the one or more processors are further configured to direct the actuator to adjust the camera lens on the axis perpendicular to the photosensor to improve at least one of the one or more image metrics in images captured using the accessory lens.

6. The system as recited in claim 1, wherein the actuator is further configured to tilt the optical axis of the camera lens with respect to the photosensor, wherein the one or more processors are further configured to:
   determine a current tilt of the optical axis of the accessory lens with respect to the optical axis of the camera lens according to at least one of the one or more image metrics; and
   direct the actuator to adjust tilt of the camera lens so that the optical axis of the camera lens is aligned with the optical axis of the accessory lens.

7. The system as recited in claim 1, wherein, to detect an accessory lens attached to the camera, the one or more processors are configured to detect the accessory lens via a sensing technology interface, wherein the sensing technology is one of an electrical, magnetic, radio frequency (RF), or optical sensing technology.

8. The system as recited in claim 7, wherein the one or more processors are further configured to:
   obtain one or more optical characteristics of the accessory lens via the sensing technology interface; and
   apply one or more image processing functions to image data captured using the accessory lens according to the obtained optical characteristics of the accessory lens.

9. The system as recited in claim 8, wherein the one or more optical characteristics include one or more of focal length, focal range, image circle diameter, or aberration parameters of the accessory lens.

10. The system as recited in claim 1, wherein, to detect an accessory lens attached to the camera, the one or more processors are configured to analyze the image data captured by the camera to determine changes to one or more optical characteristics of the camera, wherein the one or more optical characteristics include one or more of focal length or focal range of the camera.

11. A method, comprising:
    performing, by one or more processors in a device comprising a camera that includes a photosensor, a camera lens, and an actuator configured to adjust the camera lens with respect to the photosensor on one or more axes orthogonal to an optical axis of the camera lens:
      determining one or more image metrics from image data captured by the camera using an accessory lens attached to the camera;

determining a current position of an optical axis of the accessory lens with respect to an optical axis of the camera lens according to at least one of the one or more image metrics; and directing the actuator to adjust the camera lens on at least one of the one or more axes orthogonal to the optical axis of the camera lens to improve alignment of the optical axis of the camera lens with the optical axis of the accessory lens.

12. The method as recited in claim 11, wherein the one or more image metrics include one or more of sharpness, relative illumination, optical distortion, chromatic aberration, vignetting, magnification, and field of curvature.

13. The method as recited in claim 11, further comprising:
analyzing, by the one or more processors, the image data captured by the camera using the accessory lens to determine one or more optical characteristics of the accessory lens; and applying, by the one or more processors, one or more image processing functions to image data captured using the accessory lens according to the determined optical characteristics of the accessory lens.

14. The method as recited in claim 13, wherein the one or more optical characteristics include one or more of focal length, focal range, image circle diameter, or aberration parameters of the accessory lens of the accessory lens.

15. The method as recited in claim 11, wherein the actuator is further configured to adjust the camera lens on an axis perpendicular to the photosensor, the method further comprising directing, by the one or more processors, the actuator to adjust the camera lens on the axis perpendicular to the photosensor to improve at least one of the one or more image metrics in images captured using the accessory lens.

16. The method as recited in claim 11, wherein the actuator is further configured to tilt the optical axis of the camera lens with respect to the photosensor, the method further comprising:
determining, by the one or more processors, a current tilt of the optical axis of the accessory lens with respect to the optical axis of the camera lens according to at least one of the one or more image metrics; and directing, by the one or more processors, the actuator to adjust tilt of the camera lens so that the optical axis of the camera lens is aligned with the optical axis of the accessory lens.

17. The method as recited in claim 11, further comprising detecting, by the one or more processors, that the accessory lens is attached to the camera by analyzing the image data captured by the camera to determine changes to one or more optical characteristics of the camera, wherein the one or more optical characteristics include one or more of focal length or focal range of the camera.

18. A device, comprising:
one or more processors;
one or more cameras, wherein at least one of the one or more cameras is a camera comprising:
a photosensor configured to capture light projected onto a surface of the photosensor; and
a camera lens configured to refract light from an object field located in front of the camera to form an image of a scene at an image plane at or near the surface of the photosensor; and
an actuator configured to adjust the camera lens with respect to the photosensor on one or more axes orthogonal to an optical axis of the camera lens; and
a memory comprising program instructions executable by at least one of the one or more processors to:
detect an accessory lens attached to one of the one or more cameras;
determine one or more image metrics from image data captured by the camera using the accessory lens, wherein the one or more image metrics include one or more of sharpness, relative illumination, optical distortion, chromatic aberration, vignetting, magnification, and field of curvature;
determine a current position of an optical axis of the accessory lens with respect to the optical axis of the camera lens according to at least one of the one or more image metrics; and
direct the actuator to adjust the camera lens on at least one of the one or more axes orthogonal to the optical axis of the camera lens to improve alignment of the optical axis of the camera lens with the optical axis of the accessory lens.

19. The device as recited in claim 18, wherein the program instructions are further executable to:
analyze the image data captured by the camera using the accessory lens to determine one or more optical characteristics of the accessory lens, wherein the one or more optical characteristics include one or more of focal length, focal range, image circle diameter, or aberration parameters of the accessory lens of the accessory lens; and apply one or more image processing functions to image data captured using the accessory lens according to the determined optical characteristics of the accessory lens.

20. The device as recited in claim 18, wherein the actuator is further configured to adjust the camera lens on an axis perpendicular to the photosensor, wherein the wherein the program instructions are further executable to direct the actuator to adjust the camera lens on the axis perpendicular to the photosensor to improve at least one of the one or more image metrics in images captured using the accessory lens.

* * * * *